Oct. 3, 1950         S. I. ROCHWITE         2,524,178
DEVICE FOR MOUNTING PICTURES
Filed Jan. 24, 1947                            2 Sheets-Sheet 1
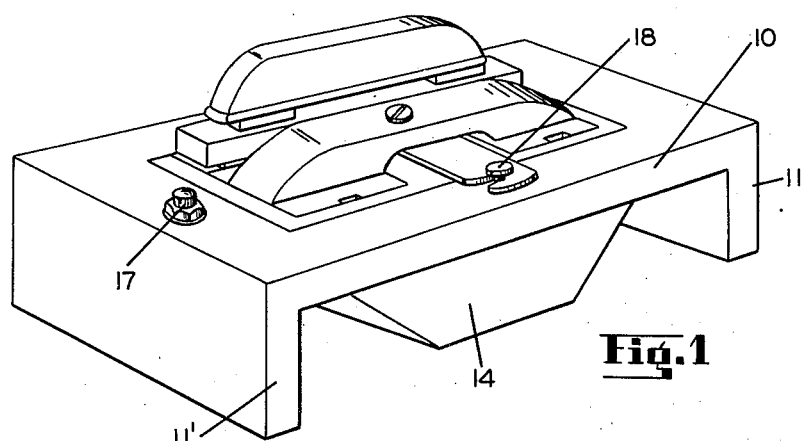
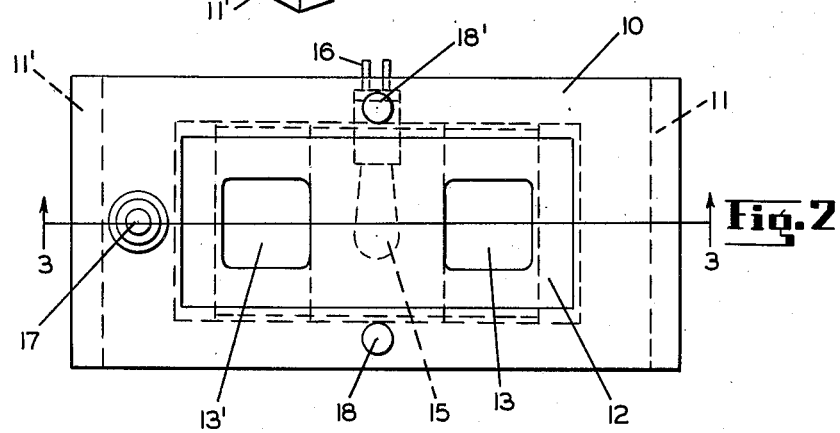
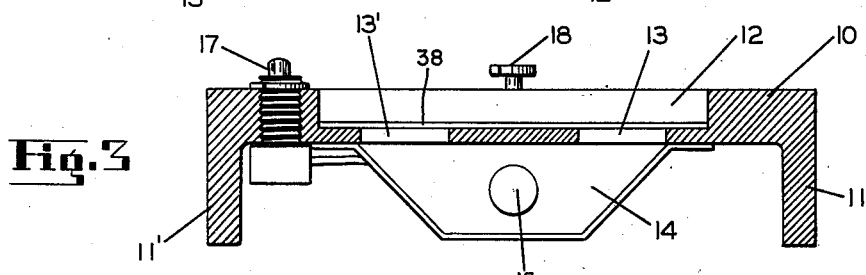
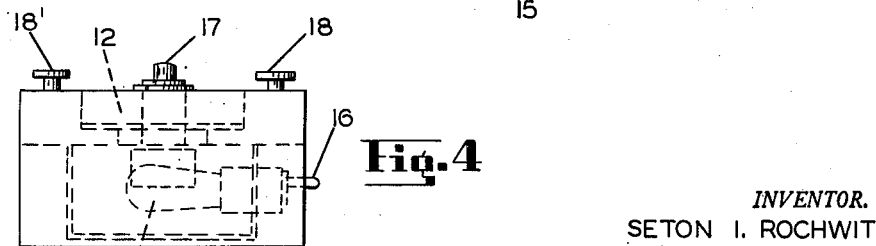
*INVENTOR.*
SETON I. ROCHWITE
BY
Christian R. Nielsen
*ATTORNEY.*

Oct. 3, 1950   S. I. ROCHWITE   2,524,178
DEVICE FOR MOUNTING PICTURES
Filed Jan. 24, 1947   2 Sheets-Sheet 2
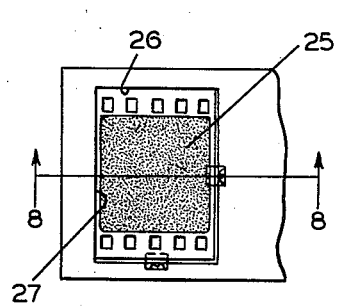
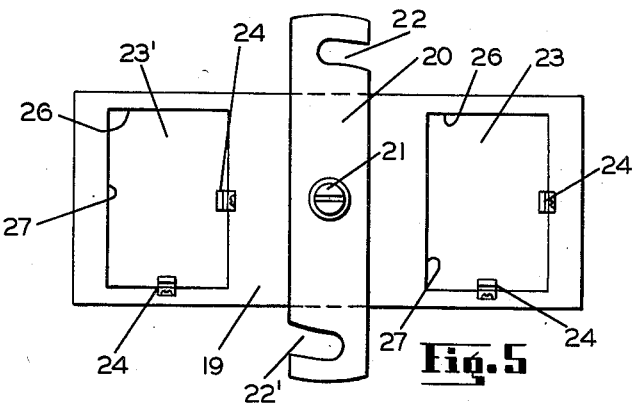
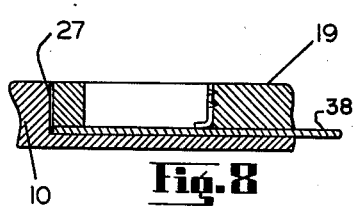
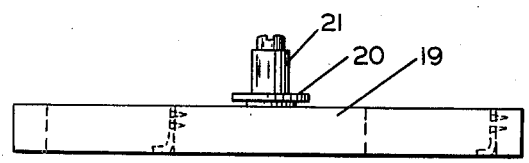
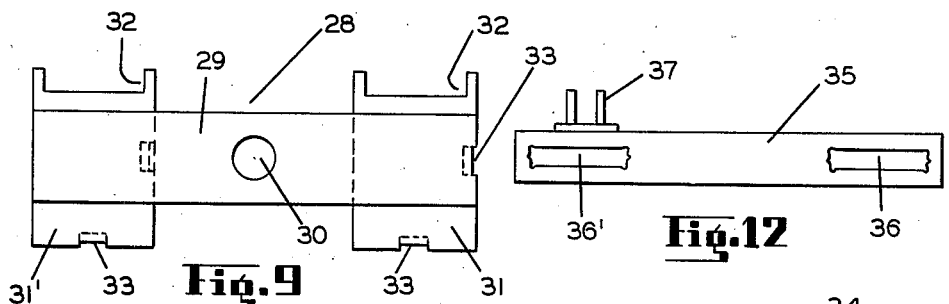
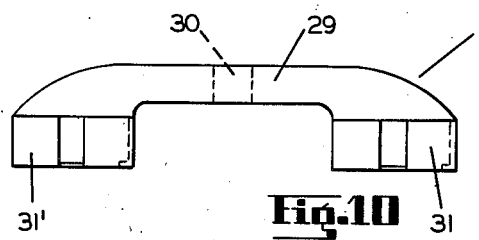
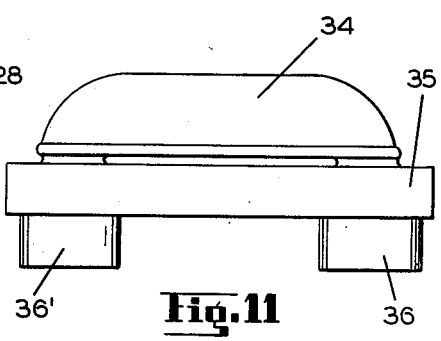
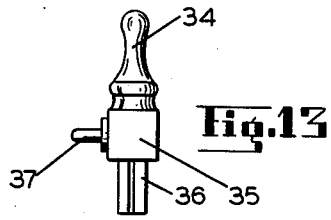
INVENTOR.
SETON I. ROCHWITE
BY Christian R. Nielsen
ATTORNEY.

Patented Oct. 3, 1950

2,524,178

UNITED STATES PATENT OFFICE 2,524,178

DEVICE FOR MOUNTING PICTURES

Seton I. Rochwite, Wauwatosa, Wis., assignor to David White Company, Milwaukee, Wis.

Application January 24, 1947, Serial No. 724,075

7 Claims. (Cl. 216—9)

My invention relates to a device for mounting pictures or photographic film onto masks or the like for stereo slides.

Stereograms or stereo slides comprise a pair of stereo pictures or films arranged in pairs at a distance apart from one another to provide the equivalent of one picture for each eye of the observer.

Obviously, when the pictures are mounted on a transparent slide it is imperative that they be mounted in accurate alignment, in order to permit simultaneous viewing of the pair of pictures.

The object of my invention is to provide a means whereby the two pictures may be accurately aligned and mounted in perfect relation to one another.

Another object of my invention is to provide a device that will mount the pair of pictures in perfect alignment with one another automatically, without depending on the skill or ability of the operator.

Still another object of my invention is to provide a means to position the pictures onto the mask or other holding means, and retain them in position so that they may be safely manipulated and handled without the danger of displacement while viewing or projecting.

Other and further objects of my invention will become more apparent as the description proceeds and when taken in conjunction with the drawing in which Figure 1 shows a perspective view of the assembled device.

Figure 2 is a plan or top view of the base portion of the device.

Figure 3 is a cross-sectional view taken at the lines 3—3 in Figure 2.

Figure 4 is an end view of the base as shown in Figure 2.

Figure 5 is a plan view of the insert or picture support fixture.

Figure 6 is a side view of the fixture shown in Figure 5.

Figure 7 is a fragmentary view of the insert with a picture in position.

Figure 8 is a fragmentary cross-sectional view taken at the line 8—8 in Figure 7.

Figure 9 is a top view of the holding member.

Figure 10 is a side view of the member shown in Figure 9.

Figure 11 is a side view of an electrically heated sealing member.

Figure 12 is a bottom view of the sealing member shown in Figure 11, and

Figure 13 is an end view of the sealing member shown in Figure 11.

Referring now to the drawing the character 10 shows a base provided with a pair of vertical standards 11 and 11' at the edges of the base member 10. Obviously, the construction of the base is rectangular as shown in Figures 1 and 2. The base 10 is provided with a rectangular opening 12 through its top and this opening 12 is provided with two apertures 13 and 13' at the bottom thereof.

At the extreme lower portion of the base 10 below the apertures 13 and 13' is shown a reflector compartment 14 provided with a lamp 15 having a source of electric current led to it as shown by the attaching plug 16. There is also shown a switch arrangement 17 for the convenience of the operator in turning on the current to energize the lamp 15 in the reflector compartment 14. The top of the base 10 is provided with a pair of upwardly extending knobs 18 and 18'. There is an insert member as shown in Figure 5 indicated by the character 19. This insert member 19 has a cross member known as a clamping member 20 pivotally mounted at 21 to its top. This cross member or clamping member 20 is provided with arcuate slots 22 and 22' and when the entire insert member 19 is inserted into the rectangular aperture 12 in the base 10 the slots 22 and 22' will be concentric with the upwardly extending knobs 18 and 18' on the top of the base member 10. The cross member 20 when disposed in a manner whereby the slots 22 and 22' engage the knobs 18 and 18' will hold the insert member 19 in the rectangular aperture 12 within the base 10. This insert member 19 is also provided with two apertures 23 and 23' spaced in a manner to register with the apertures 13 and 13' in the base member 10. The apertures 23 and 23' in the insert member 19 are provided at two of their sides with flat resilient guide members 24 which contact the edges of the pictures and provide perfect alignment of the picture shown by the character 25 in Figure 7, at the edges 26 and 27 of the apertures 23 and 23'. There is also a retaining member 28 which is inserted into the apertures 23 and 23' in the insert 19. This retaining member 28 is shown in Figures 9 and 10 and consists of a cross bar 29 having an aperture 30 to engage the upwardly extending member 21 on the insert 19 and has two downwardly disposed rectangular portions 31 and 31' for engagement into the apertures 23 and 23' in the insert member 19. These downwardly disposed members 31 and 31' are provided with recessed portions 32 at their one edge and recess portions 33 at the edges to correspond and register with the aligning member 24 in the insert member 19.

In Figures 11, 12, and 13 I show a sealing member which is provided with a handle 34 constructed of plastic or the like and is also provided with a conventional electric heating unit equipped with a thermostat. This heating unit is retained within the body 35 of the sealing member and is provided with two downwardly extending heating members 36 and 36' which convey the heat of the heating unit by conduction. These two downwardly disposed heating elements 36 and 36' are of a size to engage the recess portions 32 within the retaining member 28 as shown in Figures 9 and 10 and the heating element is provided with contact members shown as 37 for engagement with a source of current.

In operation the device functions as follows: a mask, 38, consisting of foil covered paper having an adhesive agent on its reverse side is placed into the rectangular opening 12 of the base 10 in a manner whereby the portion of the mask having the adhesive agent is to the top. This mask is provided with a pair of apertures corresponding with and spaced to register with the apertures 13 and 13' in the bottom of the base 10. The next operation is to place the insert 19 into the opening 12 of the base 10 and clamp it into position by means of the cross member 20 engaging the two knobs 18 and 18' within the slots 22 and 22'. Obviously, the apertures in the paper mask are smaller in size than the apertures 23 and 23' in the insert member 19. The apertures 23 and 23' of the insert member 19 are each to receive a picture of the stereo pair. The two adjacent edges of each of these rectangular openings, shown as 26 and 27 are in such a position as to serve as reference edges for the alignment of the pictures 25 placed therein, and they are guided at their edges by the resilient flat guide members 24 within the openings 23 and 23'. The function of the resilient members 24 is to force the pictures or films 25 against the two aligning edges 26 and 27, thereby automatically causing them to be in proper alignment.

The next operation will consist of dropping the picture for the right eye into the left hand opening, the left eye picture into the right hand opening 23 and 23', both with the emulsion side up (in the case of reversible color film) and with the top of the pictures away from the operator. The lamp 15 is actuated and caused to light by means of the switch 17 so that the operator may check whether the pictures have been properly placed in position. At this stage the pictures are merely lying in the opening, having their natural curl and as yet unaligned.

The next operation is to place the retaining member 28 into position and to press it down upon the pictures. This flattens the film and as it becomes flat the springs bear against two of the edges forcing the other two edges of the film against the reference edges or aligning edges 26 and 27 of the apertures 23 and 23' and aligning the pictures or films 25.

The next operation is to press the film sealing device which has been actuated and heated by means of electric current (or in any other manner) down into the two openings provided by the recesses 32 for that purpose. The two contact members 36 and 36' of the sealing device contact the film and heat it and the adhesive on the mask below it to the point where the adhesive agent softens and attaches the film to the mask. When removing the contact members 36 and 36' it leaves the film attached to the mask and the retaining fixture 28 can be held down for a minute and then removed so that the mask with the pictures attached can be removed for mounting between glass plates or the like for their protection in handling.

While I have shown a particular arrangement of the various parts, I do not wish to limit myself to the specific construction shown, for I am fully cognizant of the fact that in the construction of my device there can be many changes made in the form and configuration of the component parts without affecting the spirit of my invention or the scope of the appended claims.

Having thus described my invention, what I claim and desire to secure by Letters Patent in the United States is:

1. A device of the character described to be used in combination with a mask coated with an adhesive agent on one side, said device comprising a base, a recess in the top side of said base, a pair of apertures at the bottom of said recess, an insert fixture, said fixture provided with a pair of apertures registering with the apertures in said base when said fixture is inserted into the recess in said base, means for holding said insert within said base, a holding device having two projecting members supported by a cross member, each of said projecting members provided with a slot, and a sealing means having two contact members arranged for engagement within said slots, and means in said sealing means for heating the contact members.

2. A device of the character described to be used in combination with a mask having one of its sides covered with an adhesive agent, said device comprising a base having a recess in its upper face, a pair of apertures within said body below said recess, an insert provided with apertures registering within the apertures within said base, the mask to be disposed within said recess below said insert, with the adhesive agent toward the top, means for clamping said insert rigidly into said recess, a holding member provided with projecting members arranged for engagement in the apertures within said insert, means for guiding a pair of pictures into said apertures in said insert, said pictures to be held in alignment flat against said mask by said retaining member, and sealing means arranged for insertion through said holding member for contact with said pictures, said sealing means being heated and causing said adhesive agent at the top of said mask to engage the lower surfaces of said pictures.

3. A device for mounting pictures to a mask having its one side coated with an adhesive agent, a base provided with a recess, an insert in said recessed base, means for clamping said insert in said base when a mask is placed between said recess and said insert, apertures in the bottom of said recess, apertures in said insert, said apertures in the insert registering with the apertures in the recess of said base, the apertures in said base being smaller than the apertures in said mask, a holding member for supporting pictures in a position in the apertures of said insert, and sealing means projecting downward through said holding member, said sealing means being heated to cause said adhesive agent on the upper face of the mask to soften and adhere to the lower face of said picture.

4. A device for mounting pictures to a mask having its one side covered with an adhesive agent, said device comprising in combination, a base having a recess, an insert of a shape and contour to engage said recess, means for clamping said insert in position in said recess when the mask is disposed between the insert and the bottom of said recess, a pair of apertures in the bottom of said recess, a pair of apertures in said insert, said apertures in the recess registering with the apertures in said base, the apertures in said base being smaller than the apertures in said insert, the edges of the apertures in said insert being provided with resilient members to guide the edges of the pictures in perfect alignment with the two edges of the insert apertures, a holding member for supporting pictures in position within the apertures in said insert, and sealing means projecting downward through said holding means, said sealing means being heated to cause said adhesive agent on the upper face of said mask to soften and adhere to the lower face of said pictures, and a source of electric current for energizing the heating element within the sealing means.

5. A device for mounting pictures to a mask, said mask having its one side coated with an adhesive agent, said device comprising in combination, a base provided with a recess within its top, a pair of apertures disposed within the bottom of said recess, a reflector enclosure disposed below the bottom of said apertures, said enclosure provided with illuminating means, a switch accessible at the top of said base, a current supply for energizing said illuminating means through said switch, an insert to engage the recess within said base, means for clamping said insert into said recess when the mask is disposed between the bottom of the recess and the insert member, said insert member provided with a pair of apertures registering with the apertures within said base and of a size larger than the apertures within said base, a holding member, said holding member provided with projecting means for engagement with the apertures within said insert, for clamping down pictures placed within the apertures of said insert, a sealing means projecting downward through said holding means, said sealing means being equipped with an electrically energized heating element for heating said sealing means, thereby causing said adhesive agent on the upper base of said mask to soften and adhere to the lower base of said pictures, and a source of energy for energizing said heating element with said heating means.

6. A device for mounting pictures to a mask, said mask having its one side covered with an adhesive means, said device consisting of a base, said base provided with a recess, a pair of apertures disposed within the bottom of said recess through said base, a reflector compartment disposed below the base and encasing the lower face of said recesses, an illuminating means disposed within said reflector compartment, a switch mounted in said base, a source of electric energy, said switch controlling said current from said source of electric energy to said illuminating means, an insert member arranged for engagement with said recess in said base, means for rigidly clamping said insert into said recess when a mask is disposed between them said insert provided with apertures registering within the apertures within said base, the edges of the apertures within said insert being provided with flat resilient guide members to guide the edges of the pictures in perfect alignment with the two edges of said apertures in said insert plate, a holding member for supporting the pictures in position within the apertures of said insert, said retaining member provided with two slots permitting the sealing means to project through said slots, said sealing means provided with a heating element, a source of current for supplying electricity to said heating element with said sealing means, said sealing means projecting through said insert for contacting the upper face of said pictures thereby causing the adhesive agent on the upper face of said mask to soften and adhere to the lower face of said pictures due to the heat from said sealing means.

7. A device of the character described to be used in combination with a mask coated with an adhesive agent on one of its sides, said device comprising a base, an insert fixture, said fixture provided with a pair of apertures, means for holding said insert within said base, a retaining device having two projecting members supported by a cross member, said projecting members provided with slots, and a sealing means having two heated contact members arranged for engagement with said slots in the holding means.

SETON I. ROCHWITE.

REFERENCES CITED

The following references are of record in the file of this patent:

UNITED STATES PATENTS

| Number | Name | Date |
|---|---|---|
| 1,912,547 | Smith et al. | June 6, 1933 |
| 2,360,099 | Biow | Oct. 10, 1944 |